May 4, 1926.
E. A. BANSCHBACH
BUFFER TESTING DEVICE
Filed Nov. 21, 1921
1,583,109
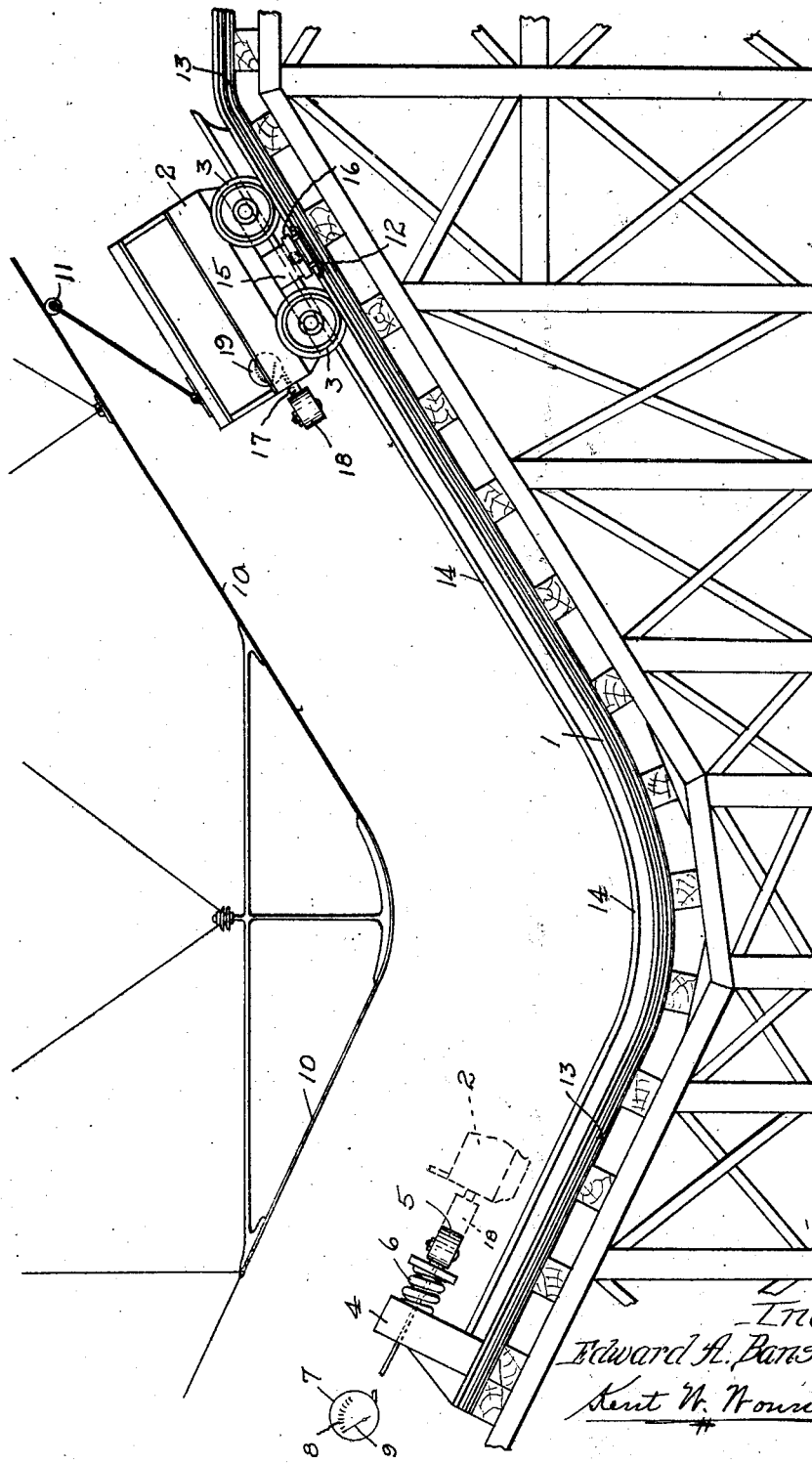
Inventor,
Edward A. Banschbach,
Kent W. Nownell
Atty.

Patented May 4, 1926.

1,583,109

UNITED STATES PATENT OFFICE.

EDWARD A. BANSCHBACH, OF CHICAGO, ILLINOIS.

BUFFER-TESTING DEVICE.

Application filed November 21, 1921. Serial No. 516,555.

*To all whom it may concern:*

Be it known that I, EDWARD A. BANSCHBACH, a citizen of the United States, residing at Chicago, in the county of Cook and State of Illinois, have invented certain new and useful Improvements in a Buffer-Testing Device, of which the following is a specification.

This invention relates particularly to a device for testing automobile buffers or bumpers, and the principal object of the invention is to provide an apparatus which simulates the conditions actually encountered in accidents or whenever buffers are brought into use. Another object of the invention is to provide an apparatus of this kind which can be easily operated and in which the test will be reliable. Further objects of the invention are to record the impacts separately upon a fixed bumper and in the movable vehicle to which the buffer to be tested is applied; to vary the speed of the vehicle; to prevent the vehicle from overturning; and in general, to provide the construction herein shown and described.

In the accompanying drawing the figure is a view illustrating the construction and operation of an invention of this class.

The common method of testing buffers is to swing a suspended weight a greater or less distance against a buffer mounted on a fixed support. This does not approximate the conditions met in actual practice, and the present invention is therefore intended to supply a buffer testing apparatus which will more closely approximate the conditions actually met in the use of buffers.

In carrying out this invention a track 1 is provided upon which a vehicle 2 is movable on its flanged wheels 3. At one end of the track is a stationary bumper post 4 which carries a projecting adjustable bumper 5 supported by a strong spring 6. Connected with the bumper 5 is an indicator 7 having a graduated dial 8 and a movable pointer 9 to indicate or record the force of an impact received by the bumper 5. This indicator 7 is preferably mounted upon a support separate from the bumper post 4 so that it can be more easily read and will be less affected by any movement of the bumper.

The vehicle 2 is of heavy and sturdy construction capable of withstanding shocks and may be provided with an electric motor or other propelling means. For this purpose an overhead conductor 10 is provided and engaged by a trolley wheel 11 carried by the vehicle, and a sliding shoe 12 may be provided for engaging a conductor rail 13 to complete the motor circuit.

Between the rails of the track 1 is a flanged guard rail 14, and extending outwardly from the vehicle 2 are supports 15 at the side of the rail which carry inwardly projecting heads 16 to engage the flange of the rail 14 if the vehicle tends to jump from its track 1 upon impact.

At the front of the vehicle 2 is a support 17 upon which buffers 18 to be tested, are adjustably mounted, in the same way that buffers of this class are attached to motor vehicles. By making both the bumper 5 adjustable on the post 4, and the buffer 18 adjustable on the vehicle, any desired variation simulating an actual condition and an actual accident may be closely approximated.

It will be understood that this apparatus may be mounted upon a straight or level track particularly when a suitable propelling is provided for the vehicle 2, or the tracks may be formed with a straight portion, with a downwardly inclined portion, or the fixed bumper may even be mounted on a downwardly inclined portion. In the latter case a trestle work such as illustrated in the drawing may be necessary.

It will be seen that the vehicle may be positively propelled by a suitable motive power or it may be allowed to attain sufficient momentum by moving down an incline, and the forward inclination of the track adjacent the fixed bumper may be such as to cause a rapidly decreasing or stopping movement of the vehicle which approximates that of applying the brakes in attempting to stop a vehicle.

In the vehicle 2 an indicating or recording dial 19 may also be provided which is suitably connected with the buffer 18 to be tested, and it is obvious that different speeds may be imparted to the vehicle by the motor or by varying the distance which the vehicle moves upon the inclined portion. By adjusting the positions of the buffer 18 and the bumper 5, many different conditions and tests can be made, the indicators 19 and 7 being read at the time and immediately after the impact. By this method of and apparatus for testing, the relative strength and resistance of different buffers can be determined under conditions which are so nearly the same and that so nearly approximate actual conditions, that there is a proper basis for rating or grading them.

I claim:

1. In a buffer testing apparatus, a wheeled vehicle carrying a buffer to be tested, a track upon which the vehicle moves, a flanged rail in the track between the wheels, a fixed bumper at one end of the track, means for imparting motion to the vehicle, and means in connection with the vehicle for engaging the flanged rail between the wheels to prevent overturning of the vehicle upon impact of the buffer with the bumper.

2. In a buffer testing device, a vehicle for carrying a buffer to be tested, an inclined way upon which the vehicle is movable, and an adjustable bumper at the end of the way to engage the buffer simulating an actual collision.

3. In a buffer testing apparatus, a vehicle to carry a buffer to be tested, an inclined way to impart motion to the vehicle with an upwardly inclined portion to retard the movement of the vehicle, and a fixed bumper in the retard portion of the way adapted to engage the buffer.

4. In a buffer testing apparatus, a vehicle for carrying a buffer to be tested, a downwardly inclined way with an upwardly inclined portion at the end thereof for imparting motion to and retarding the vehicle, a fixed bumper in the upwardly inclined portion of the way, and additional means for positively driving the vehicle.

5. In a buffer testing apparatus, a power driven vehicle for carrying a buffer to be tested, an outwardly inclined track for the vehicle and an upwardly inclined portion of track beyond the downwardly inclined track, a fixed bumper at the end of the upwardly inclined portion, and means for preventing the vehicle from overturning when it engages the bumper.

6. The method of testing buffers which consists in providing a movable vehicle to which a buffer to be tested is applied, in providing a fixed abutment with an adjustable bumper for engaging the vehicle buffer, and in imparting movement to the vehicle, so that a buffer carried thereby will engage the bumper, simulating an actual collision.

7. The method of testing buffers which consists in providing a vehicle to which a buffer is applicable, in providing a way upon which the vehicle is movable with an upwardly inclined portion, and in locating a fixed bumper on the upwardly inclined portion so that a buffer carried by the vehicle will engage the bumper, the upwardly inclined portion of the way sharply retarding the movement of the vehicle to simulate a rapid stop thereof.

8. The method of testing buffers which consists in providing a movable vehicle and a fixed abutment having an adjustable bumper in the path thereof, in imparting movement to the vehicle, and in applying a buffer to be tested to receive the impact of the vehicle with the bumper simulating an actual collision.

9. The method of testing buffers which consists in providing a movable vehicle and an inclined way for imparting movement thereto, and in placing an adjustable bumper in the path of the vehicle so that a buffer disposed between the vehicle and bumper will be subjected to a condition simulating an actual collision.

10. The method of testing buffers which consists in providing a movable vehicle and an abutment to one of which a vehicle buffer to be tested is adjustably secured, and in providing a way for the vehicle, a part of which is inclined to impart motion thereto in simulating the conditions of an actual collision.

11. The method of testing vehicle buffers which consists in providing a movable vehicle, and an abutment, to which vehicle buffers to be tested may be secured and in providing for the variation or adjustment of one of such buffers, and in providing a way for the vehicle, a part of which is inclined to impart motion thereto in subjecting the buffers to the conditions of an actual collision.

12. In a testing apparatus for vehicle buffers, a vehicle to carry a buffer to be tested in a fixed position extending across the end of the vehicle, means to impart motion to the vehicle, and a fixed bumper with an adjustable buffer in the path of the vehicle to simulate the conditions of an actual collision between the two buffers.

13. In a testing apparatus for vehicle buffers, a vehicle to carry a buffer to be tested in a fixed position across the front thereof, means to impart motion to the vehicle, and a vehicle buffer adjustable in the path of the vehicle to receive the impact of a buffer carried thereby simulating the conditions of an actual collision.

14. In a testing device for vehicle buffers, a vehicle to carry a buffer to be tested in a fixed position extending across the front of the vehicle, means to impart motion to the vehicle, a fixed bumper in the path of the vehicle, and a vehicle buffer adjustably fixed on the bumper to receive the impact of the vehicle and a buffer thereon to simulate the conditions of an actual collision.

EDWARD A. BANSCHBACH.